United States Patent [19]
Okabayashi

[11] 4,387,446
[45] Jun. 7, 1983

[54] STACK CONTROL SYSTEM
[75] Inventor: Terushi Okabayashi, Zama, Japan
[73] Assignee: Hitachi, Ltd., Tokyo, Japan
[21] Appl. No.: 204,779
[22] Filed: Nov. 7, 1980
[30] Foreign Application Priority Data
Nov. 14, 1979 [JP] Japan .................... 54/146580
[51] Int. Cl.³ .................................. G11C 13/00
[52] U.S. Cl. .............................. 365/189; 365/230
[58] Field of Search ................ 365/174, 189, 230
[56] References Cited
U.S. PATENT DOCUMENTS
3,763,480 10/1973 Weimer .......................... 365/238

*Primary Examiner*—Terrell W. Fears
*Attorney, Agent, or Firm*—Antonelli, Terry & Wands

[57] ABSTRACT

A stack control system serves for transferring information issued from an information source to an information receiving unit through a stack unit which includes a plurality of stacks for storing therein the information from the information source, the information being then transferred to the information receiving unit from the stacks. The information source includes a unit for supervising the idle state of the stacks. The stack request signal is generated to the stack unit under the control of the supervising unit.

4 Claims, 5 Drawing Figures

STACK CONTROL SYSTEM

BACKGROUND OF THE INVENTION

1. Field of the Invention

The present invention relates to a stack control system. More particularly, the invention concerns a stack control system in which information issued from an information source is transferred to an information receiving unit by way of a stack unit which has a plurality of temporal stores referred to as the store stack.

2. Description of the Prior Art

In order to have a better understanding of the invention, description will first be made of a hitherto known stack control system in some detail by referring to FIGS. 1 and 2 of the accompanying drawings. In FIG. 1, a store request issued from a store request circuit 111 contained in a processing unit 11 as an information generating source is stored temporarily in a stack unit 12 before the information is stored in a memory unit 13. It is assumed that the stack unit 12 incorporates therein two store stacks 121 (A and B). When the store request signal REQ issued from the store request circuit 111 is supplied to the stack unit 12, the output signal from an AND circuit 124 is checked to detect whether both of STACK-A BUSY signal produced from a stack-A busy latch 122 and STACK-B BUSY signal from a stack-B busy latch 123 are logic "1"s or not. If the AND product is found not to be logic "1", meaning that either the stack-A or stack-B is not busy (i.e. not in use), the output from an AND circuit 125 will be logic "1". Then, an accept signal ACPT is issued from a latch 126, whereby the concerned information such as data, address, control signal and the like is stored in the store stack which is idle at that time. In response to the accept signal ACPT, the request signal REQ is reset by the store request circuit 111 of the processing unit 11. The store request circuit 111 is now in the state to prepare for issuance of a next store request. When the information stored in one of the store stacks 121 (A and B) is transferred to the memory unit 13, the corresponding STACK BUSY signal is reset, indicating that the associated store stack is now idle.

FIG. 2 shows a time chart to illustrate store stack operations of the system shown in FIG. 1 as a function of time. In the initial state, both the stacks 121-A and 121-B are idle. As can be seen from this diagram, the first accept signal ACPT ① is issued in response to the first store request signal REQ ①. The signal STACK-A BUSY becomes then logic "1", while the stack store request signal REQ ① is reset. For the second store request REQ ②, the signal STACK-B BUSY also takes logic "1" level in a similar manner. However, for the third request signal REQ ③, the accept signal ACPT is not issued instantly. When the signal STACK-A BUSY is reset, that is, when the store request REQ stored in the stack A is accepted by the memory unit 13 to make the stacking of information unnecessary, the accept signal ACPT becomes logic "1".

In connection with the issuance rate of the store request signal produced from the processing unit 11, it will be seen that the rate at which the signals are transmitted reciprocatively among the units 11, 12 and 13 is subjected to a limitation, making it essentially impossible to further increase the rate of the store request signal in the case of the hitherto known stack control system, because any succeeding request signal REQ is inhibited from being issued until the accept signal ACPT is restored. As a consequence, the function of the stack unit 12 which is inherently destined to accommodate any difference in the operation speed between the processing unit 11 and the memory unit 13 can not be fully made use of.

SUMMARY OF THE INVENTION

An object of the present invention is to provide a stack control system in which the use efficiency of the stack is enhanced without imposing a restriction on the issuance rate of the stack request to the stack unit.

Though in the conventional stack control system the stack unit plays a primary role in the stack control in respect that the devices at the request issuing side operate in accordance with the control signals (such as the request accept signal, the request suppression signal or the like) produced from the stack unit, the invention is characterized in that the idle state of the stack is supervised at the request issuing side.

DETAILED DESCRIPTION OF THE PREFERRED EMBODIMENTS

Figure 1:
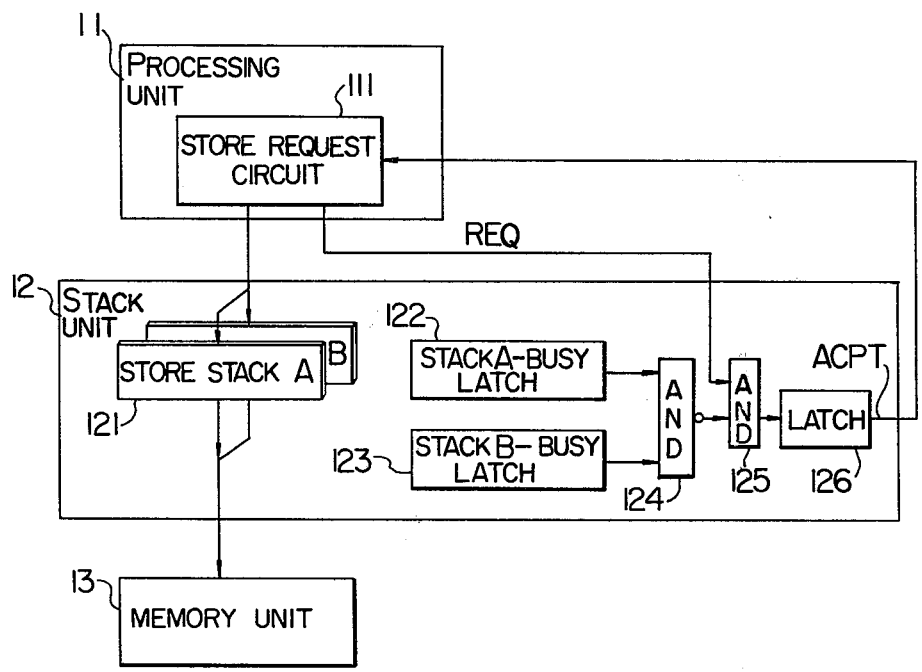
FIG. 1 is a block diagram illustrating a general arrangement of the conventional stack control system.
Figure 2:
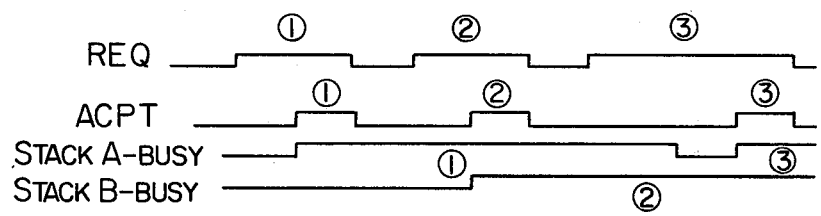
FIG. 2 shows a time chart to illustrate operation of the stack control system shown in FIG. 1.
Figure 3:
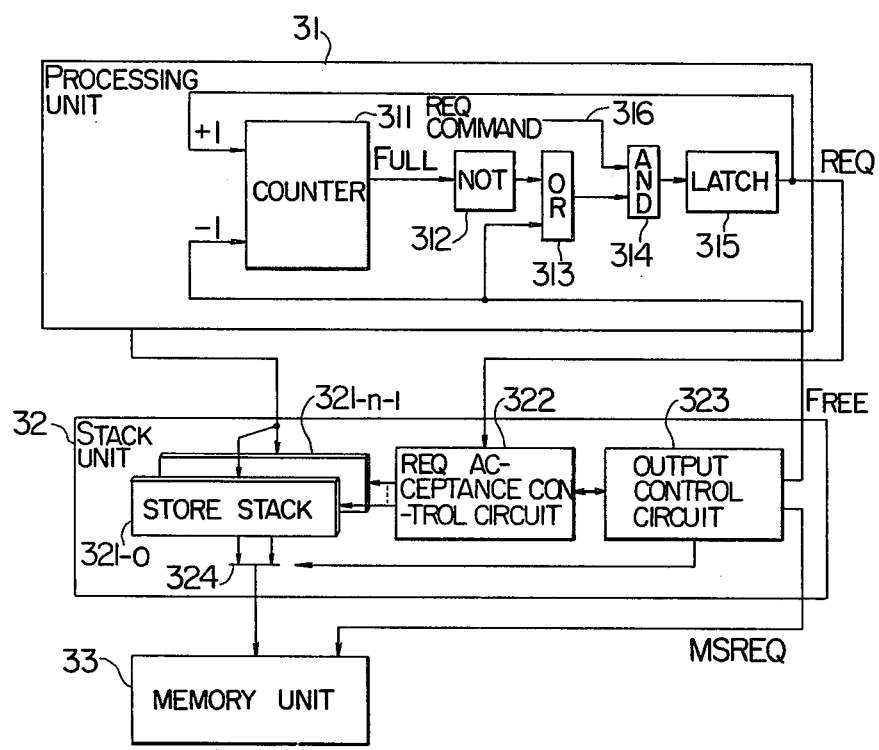
FIG. 3 is a block diagram showing a general arrangement of a stack control system according to an embodiment of the invention.

Referring to FIG. 3, when a memory request signal to a memory unit 33 is issued by a processing unit 31, the information output from the processing unit 31 is temporarily stored in n store stacks 321-0 to 321-n-1 provided in a stack unit 32 and later on transferred to the memory unit 33.

The processing unit 31 has a counter 311. When the counter 311 counts up to the number n (i.e. the number of the store stacks), a signal FULL of logic "1" level is produced. This counter 311 is initialized to zero in the initial state and incremented by one (i.e. counts up by 1) for every store request signal REQ issued from a latch circuit 315, while being decremented by one (i.e. counting down by 1) for every signal FREE produced from an output control circuit 323 of the stack unit 32 and indicating that a corresponding one of the store stacks 321-0 to 321-n-1 is in the idle state or free.

Figure 5:
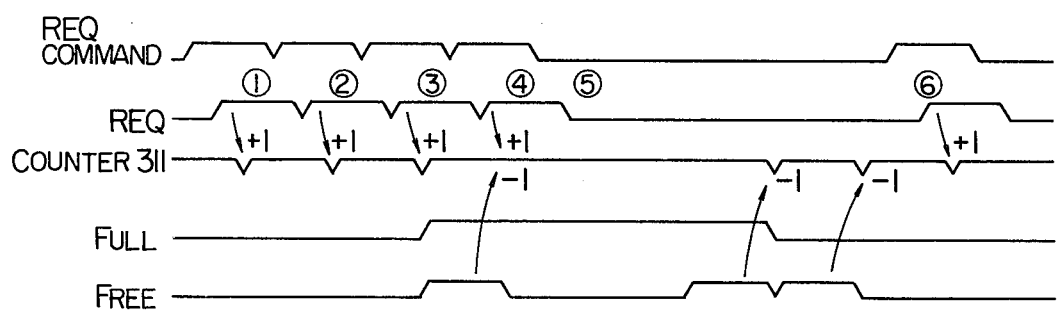
FIG. 5 is a signal-timing chart to illustrate operation of the stack control system shown in FIGS. 3 and 4.

When an event requiring the issue of a store request occurs in the processing unit 31, a store request command signal REQ COMMAND is produced on a line 316 leading to an input of an AND circuit 314. When the AND circuit 315 is thereby enabled, a store request signal REQ is issued to the stack unit 32 by a latch circuit 315. The conditions for the AND circuit 314 to be enabled are fulfilled either when the count of the counter 311 is short of the number n, resulting in the signal FULL of logic "0" when the idle stack signal FREE (which will hereinafter be described in detail) is currently being issued from the stack unit 32, as will be appreciated from the presence of a NOT circuit 312 and an OR circuit 313. Referring to the signal-timing diagram shown in FIG. 5, the first to third store request signals REQ ①, ②  and ③ correspond to the cases in which the signal FULL is logic "0", while the fourth store request signal REQ ④ corresponds to the case where the signal FULL is logic "1" and at the same time the signal FREE is also logic "1". At the phase for the fifth store request signal REQ ⑤, this signal is not issued because of the absence of the store request command REQ COMMAND. At the next phase, the store request command is again produced, whereby the sixth store request signal REQ ⑥ is issued because of the signal FULL being logic "0".

In this manner, as long as the counted value of the counter 311 remains smaller than the value n, the store request signal REQ is issued to the stack unit 32 for every occurrence of the store request commands REQ COMMAND on the line 316 in the processing unit 31.

In the stack unit 32, the store request acceptance control circuit 322 accepts sequentially the store request signal REQ issued by the processing unit 31, whereby the relevant information such as data, address, control signal and the like is stored sequentially in the store stacks 321-0 to 321-n-1, while memory store request signals MSREQ are produced to the memory unit 33 from the output control circuit 323 in the same sequence as the corresponding stack store request signals REQ were accepted. When the information stored in the stack corresponding to the issued memory store request MSREQ is transferred to the memory unit 33 with the stacking or temporal storing of information being rendered unnecessary, the idle stack signal FREE is sent to the processing unit 31. In this connection, it should be noted that the time when the signal FREE is sent out need not necessarily correspond to a time point at which the storing of information in the corresponding store stack is rendered utterly unnecessary through transfer of that information to the memory unit, but may be an appropriate time point which precedes the time point at which the memory store request signal MSREQ is actually issued to the memory unit 33 and the stack of information becomes unnecessary. In the latter case, the time span between the issuance of the signal MSREQ and the time point preceding thereto for sending out the signal FREE should preferably be so selected as to be substantially equal to a delay time involved by the reciprocative communication or transaction between the stack unit 32 and the processing unit 31. In this way, the idling time of the store stack 321 can be minimized, whereby the use efficiency or utility of the store stack unit can be correspondingly increased to an additional advantage.

Figure 4:
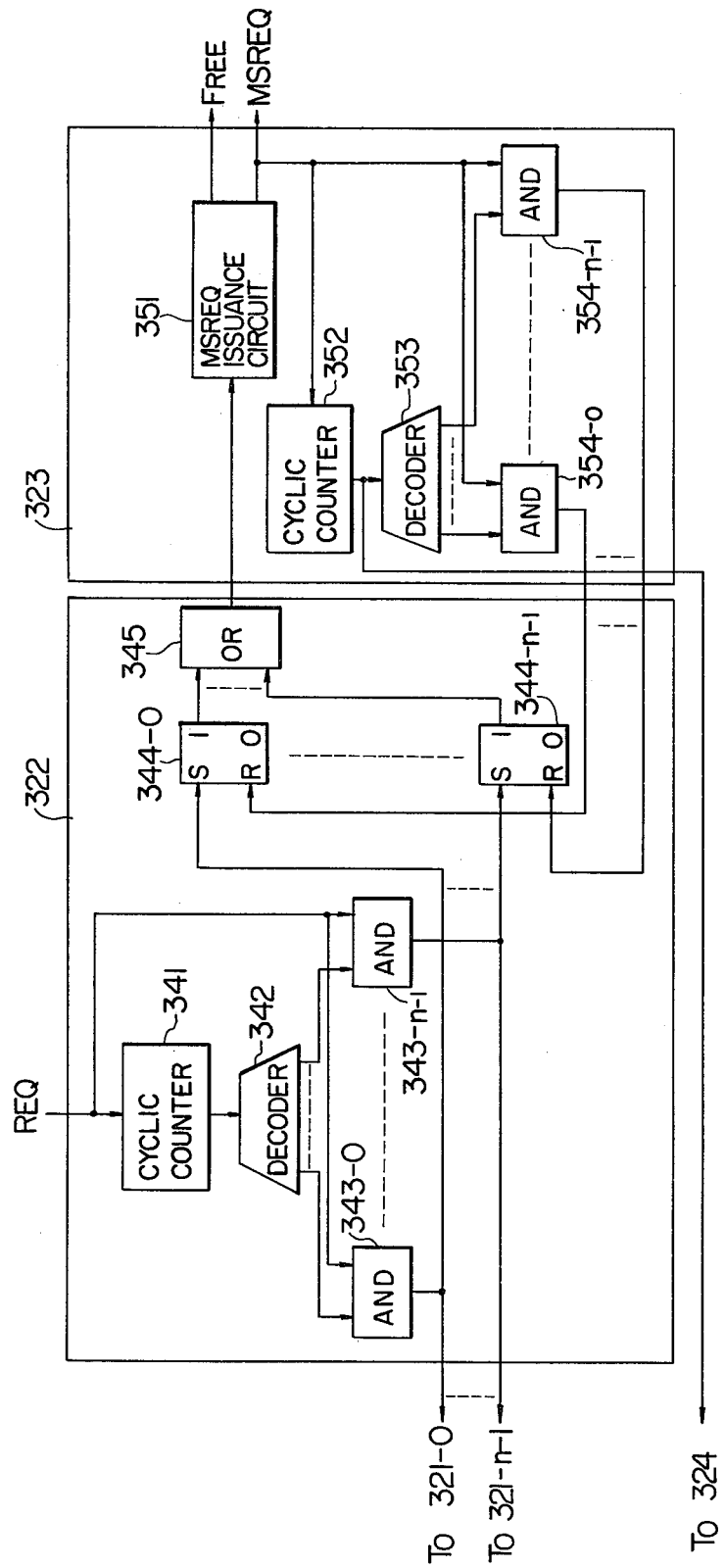
FIG. 4 is a block diagram showing details of the store request control circuit and the output control circuit employed in the control system shown in FIG. 3.

FIG. 4 shows concrete examples of the store request acceptance control circuit 322 and the output control circuit 323 shown in block in FIG. 3. The REQ acceptance control circuit 322 includes a cyclic counter 341 which is adapted to be incremented by one unit in response to every store request signal REQ issued from the processing unit 31 for counting cyclically zero to (n−1) which is equal to the number of the stack stores. The output signal from the counter 341 is supplied to a decoder 342, the decoded outputs from which in turn are supplied to one input of corresponding AND circuits 343 each having the other input supplied with the store request signal REQ. The number of such AND circuits 343-0 to 343-n-1 corresponds to the number of the store stacks 321-0 to 321-n-1 and arrangement is made such that output signals from the individual AND circuits 343 are supplied to the associated store stacks 321, respectively, to activate these stacks for accepting the information from the processing unit 31. Consequently, when the store request signal REQ is supplied, the associated information from the processing unit 31 is stored in the store stack 321 indicated by the cyclic counter 341 at that time, whereupon the cyclic counter 341 is incremented by one (+1) to indicate the succeeding store stack 321 in which the information from the processing unit 31 is next to be stored.

Flip-flops 344-0 to 344-n-1 are provided in correspondence with the individual store stacks 321-0 to 321-n-1 and are adapted to be set by the output signal from the associated AND circuits 343. The set state of the flip-flop 344 indicates that the associated store stack 321 stores therein information (i.e. busy). The set output signals of the individual flip-flops 344 are supplied to a MSREQ issuance circuit 351 of the output control circuit 323 through an OR circuit 345. In response to the output signal from the OR circuit 345 the MSREQ issuance circuit 351 transmits the memory store request signal MSREQ to the memory unit 33, provided the memory unit 33 is not busy.

The output control circuit 323 includes a cyclic counter 352 which is incremented by one in response to each of the memory store request signals MSREQ, to thereby count cyclically in the range from 0 to n-1 which is equal to the number of the store stacks. The output signal from the counter 352 is supplied to a selector 324 which produces on a line to the memory unit 33 the signal representative of the information of the store stack 321 designated by the counter 352. Further, the output signal from the counter 352 is suppled to a decoder 353 the output signal from which in turn is supplied to one input of AND circuits 354 having the other inputs supplied with the memory store request signal MSREQ. The AND circuits 354-0 to 354-n-1 are provided in correspondence with the store stacks 321-0 to 321-n-1. The outputs from the individual AND gates 354 are supplied to the reset inputs of the associated flip-flops 344, respectively. Accordingly, when the signal MSREQ is issued, the flip-flop 344 designated by the cyclic counter 352 at that time is reset, while the counter 352 is incremented by one (+1). The memory unit 33 receives the information on the line extending from the store stack when the memory unit receives the signal MSREQ.

By initializing the counters 341 and 352 to zero in the initial state, the information is transferred to the memory unit in the same sequence as the information was stored in the store stack.

According to the invention, the store request signal REQ to the stack unit 32 can be issued by the processing unit 31 without any need for interrogating the stack unit 32 at a rate determined by the processing unit 31. Thus, the issuance of the store request signal REQ is set free from restriction imposed by the time delay required for reciprocative communication between the processing unit 31 and the stack unit 32, whereby the data processing speed of the processing unit is significantly increased, eventually resulting in the enhanced processing speed of the whole data processing system including the processing unit 31, the stack unit 32, memory unit and so forth.

I claim:

1. A stack control system in which information issued from an information source is transferred to an information receiving unit through a stack unit having a plurality of stacks, said stack control system comprising:

an information source including means for supervising the idle state of said stacks and means for generating a stack request signal under the control of said supervising means only when one of said stacks is idle; and means in said stack unit including said plurality of stacks for storing the information from said information source in response to the stack request signal from said stack request signal generating means, and control means for controlling the transfer of information from said stacks to said information unit and for producing an idle stack signal in response thereto;

said supervising means including means for receiving said stack request signal from said stack request signal generating means and said idle stack signal from said control means and for supervising the idle state of said stacks in response thereto.

2. A stack control system according to claim 1, wherein said control means includes means for producing said idle stack signal for every transfer of information from said stacks to said information receiving unit.

3. A stack control system according to claim 1 or 2, wherein said supervising means includes counter means for counting to a number which is equal to the number of said stacks, said counter means including a counter controlled to count up in response to said stack request signal and count down in response to said idle stack signal.

4. A stack control system according to claim 3, wherein said supervising means includes means for inhibiting the issuance of a stack request signal from said stack request signal generating means when no idle stack signal is received and the contents of said counter means is equal to the number of said stacks.

* * * * *